(12) United States Patent
Akiyoshi et al.

(10) Patent No.: US 10,811,938 B2
(45) Date of Patent: Oct. 20, 2020

(54) ROTATING ELECTRICAL MACHINE

(71) Applicant: Mitsubishi Electric Corporation, Tokyo (JP)

(72) Inventors: Masao Akiyoshi, Tokyo (JP); Yuzuru Kobayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 199 days.

(21) Appl. No.: 16/066,905

(22) PCT Filed: Apr. 7, 2016

(86) PCT No.: PCT/JP2016/061356
§ 371 (c)(1),
(2) Date: Jun. 28, 2018

(87) PCT Pub. No.: WO2017/175343
PCT Pub. Date: Oct. 12, 2017

(65) Prior Publication Data
US 2019/0020243 A1  Jan. 17, 2019

(51) Int. Cl.
*H02K 9/06* (2006.01)
*H02K 5/18* (2006.01)
(Continued)

(52) U.S. Cl.
CPC .............. *H02K 9/06* (2013.01); *H02K 5/18* (2013.01); *H02K 11/046* (2013.01); *H02K 11/05* (2016.01); *H02K 19/36* (2013.01); *H02K 19/365* (2013.01)

(58) Field of Classification Search
CPC ........ H02K 11/05; H02K 5/18; H02K 11/046; H02K 19/36; H02K 19/365; H02K 9/02; H02K 9/04; H02K 5/20; H02K 11/049
See application file for complete search history.

(56) References Cited

U.S. PATENT DOCUMENTS 6,812,604 B2 * 11/2004 Braun ................. H02K 11/046
310/52
7,723,875 B2   5/2010 Fakes
(Continued)

FOREIGN PATENT DOCUMENTS

DE  102008002638 A1  12/2009
JP    2007-110777 A   4/2007
(Continued)

OTHER PUBLICATIONS

International Search Report of PCT/JP2016/061356 filed Jun. 21, 2016.
(Continued)

*Primary Examiner* — Thienvu V Tran
*Assistant Examiner* — Bart Iliya
(74) *Attorney, Agent, or Firm* — Sughrue Mion, PLLC; Richard C. Turner

(57) ABSTRACT

Radial direction outer side sizes of a first rectifying unit, a circuit board, and a second rectifying unit configuring a rectifying device are disposed so as to be sequentially smaller in a direction away from a frame of a rotating electrical machine main body, and at predetermined intervals, a cover covering the rectifying device has a cover end wall portion, a cover outer wall portion, and a cover intermediate portion, an inner peripheral side inlet portion is formed in the cover end wall portion, an outer peripheral side inlet portion is formed in the cover intermediate portion, and the outer peripheral side inlet portion is formed of an axial direction covering portion, and a radial direction covering portion that connects the axial direction covering portion and an outer peripheral portion of the cover end wall portion.

3 Claims, 8 Drawing Sheets

(51) Int. Cl.
*H02K 11/04* (2016.01)
*H02K 11/05* (2016.01)
*H02K 19/36* (2006.01)

(56) References Cited

U.S. PATENT DOCUMENTS

| | | | |
|---|---|---|---|
| 2004/0041476 A1* | 3/2004 | Ihata | H02K 5/15 |
| | | | 310/68 D |
| 2006/0012253 A1* | 1/2006 | Vasilescu | H02K 5/20 |
| | | | 310/58 |
| 2010/0171379 A1* | 7/2010 | Ito | H02K 9/06 |
| | | | 310/62 |
| 2011/0215659 A1 | 9/2011 | Amaral | |
| 2012/0306300 A1 | 12/2012 | Ishikawa et al. | |

FOREIGN PATENT DOCUMENTS

| | | |
|---|---|---|
| JP | 2009-060711 A | 3/2009 |
| JP | 2010-041849 A | 2/2010 |
| WO | 2011-111246 A1 | 9/2011 |

OTHER PUBLICATIONS

Communication dated Mar. 7, 2019, from the European Patent Office, in counterpart application No. 16897900.3.

* cited by examiner

ROTATING ELECTRICAL MACHINE

This application is a National Stage of International Application No. PCT/JP2016/061356 filed Apr. 7, 2016.

TECHNICAL FIELD

The present invention relates to a rotating electrical machine such that a heat dissipating performance of a rectifying device is improved.

BACKGROUND ART

A rotating electrical machine including a stator, a rotor disposed opposing the stator, and a support frame that supports the stator and the rotor, wherein a negative side diode is provided in the support frame, a positive side diode is provided in a heat sink disposed opposing the support frame, and each diode is cooled by causing external air to flow along a flow path formed between the support frame and the heat sink, is known as an existing rotating electrical machine. Also, a rotating electrical machine such that an opposing plate is provided on a radial direction outer side of a cover covering a heat sink opposing an outer peripheral face of the cover, and external air is led between a support frame and the heat sink along an axial direction flow path formed between the outer peripheral face of the cover and the opposing plate, is known as an existing rotating electrical machine (for example, refer to Patent Document 1).

CITATION LIST

Patent Literature

Patent Document 1: U.S. Pat. No. 7,723,875 (particularly FIG. 5)

SUMMARY OF INVENTION

Technical Problem

However, the heretofore described kind of existing rotating electrical machine is such that the opposing plate needs to be disposed farther to the radial direction outer side than the outer peripheral face of the cover, because of which there is a drawback in that the rotating electrical machine increases in size. Also, in order to restrict the increase in size of the rotating electrical machine, narrowing the axial direction flow path by bringing the opposing plate nearer to the outer peripheral face of the cover is also conceivable, but in this case, pressure loss of external air flowing along the axial direction flow path increases, because of which an amount of external air supplied to an inside of the rotating electrical machine decreases, and a cooling performance with respect to a part such as a diode inside the rotating electrical machine decreases.

Furthermore, cooling air on the support frame side flows in the axial direction from an inlet port of the cover, heads for the flow path between the support frame and the heat sink, and changes the orientation of the flow by 90 degrees at an entrance. At this time, the support frame is on an inner side and the heat sink is on an outer side, because of which the cooling air is biased toward the support frame due to the effect of centrifugal force, and a separation region is formed on a surface of the heat sink. As the separation region blocks the flow path, there is considerable resistance, which reduces the amount of cooling air, and reduces the coolability of a diode or the like.

The invention, having been contrived in order to resolve the heretofore described kinds of problem, has an object of providing a rotating electrical machine such that cooling performance with respect to a rectifying device can be improved, while restricting an increase in size.

Solution to Problem

A rotating electrical machine according to the invention includes a rotating electrical machine main body having a stator, a rotor disposed opposing the stator and rotating with an axial line of a rotating shaft as a center, a fan provided on an axial line direction end portion of the rotor, and a frame that supports the stator and the rotor, a rectifying device attached to the rotating electrical machine main body on an outer side in the axial line direction of the rotating electrical machine main body, and a cover attached to the rotating electrical machine main body and covering the rectifying device, wherein the rectifying device has a plate-form first rectifying unit provided on the cover side, a plate-form second rectifying unit provided on the frame side, and a plate-form circuit board provided between the first rectifying unit and the second rectifying unit, and radial direction outer side sizes of the second rectifying unit, the circuit board, and the first rectifying unit are formed so as to be sequentially smaller in a direction away from the frame, and are disposed at predetermined intervals, the cover is formed of a cover end wall portion positioned farther to the outer side in the axial line direction than the rectifying device, a cover outer wall portion positioned farther to the outer side in the radial direction than the rectifying device, and a cover intermediate portion interposed between the cover end wall portion and the cover outer wall portion, an inner peripheral side inlet portion having an inlet hole is formed in the cover end wall portion, an outer peripheral side inlet portion having an inlet hole is formed in the cover intermediate portion, and the outer peripheral side inlet portion has a radial direction covering portion existing in a position nearer the frame in the axial line direction than the cover end wall portion, and an axial direction covering portion that connects the radial direction covering portion and an outer peripheral portion of the cover end wall portion, an upper face of one portion of circumferential ribs configuring an inlet port of the axial direction covering portion is positioned farther to the outer side in the axial line direction than a gap between the circuit board and the first rectifying unit, and an upper face of one portion of circumferential ribs configuring an inlet port of the radial direction covering portion is positioned farther to the outer side in the axial line direction than a gap between the circuit board and the second rectifying unit.

Advantageous Effects of Invention

According to the invention, radial direction outer side sizes of a second rectifying unit, a circuit board, and a first rectifying unit are formed so as to be sequentially smaller in a direction away from a frame, because of which a flow of cooling air can be led into a gap between the first rectifying unit and the circuit board and a gap between the second rectifying unit and the circuit board, an amount of cooling air flowing through the gaps is increased, and coolability of heat generating parts attached to the first rectifying unit and the second rectifying unit can be increased.

Also, owing to the radial direction outer side sizes of the second rectifying unit, the circuit board, and the first rectifying unit being formed so as to be sequentially smaller in the direction away from the frame, an overall increase in size of a rotating electrical machine can be restricted.

DESCRIPTION OF EMBODIMENTS

Hereafter, the invention will be described based on FIG. 1 to FIG. 8, which show a first embodiment. Herein, for example, a vehicle-use alternating current generator mounted in a vehicle such as an automobile will be described as an example of a rotating electrical machine.

First Embodiment

Figure 1:
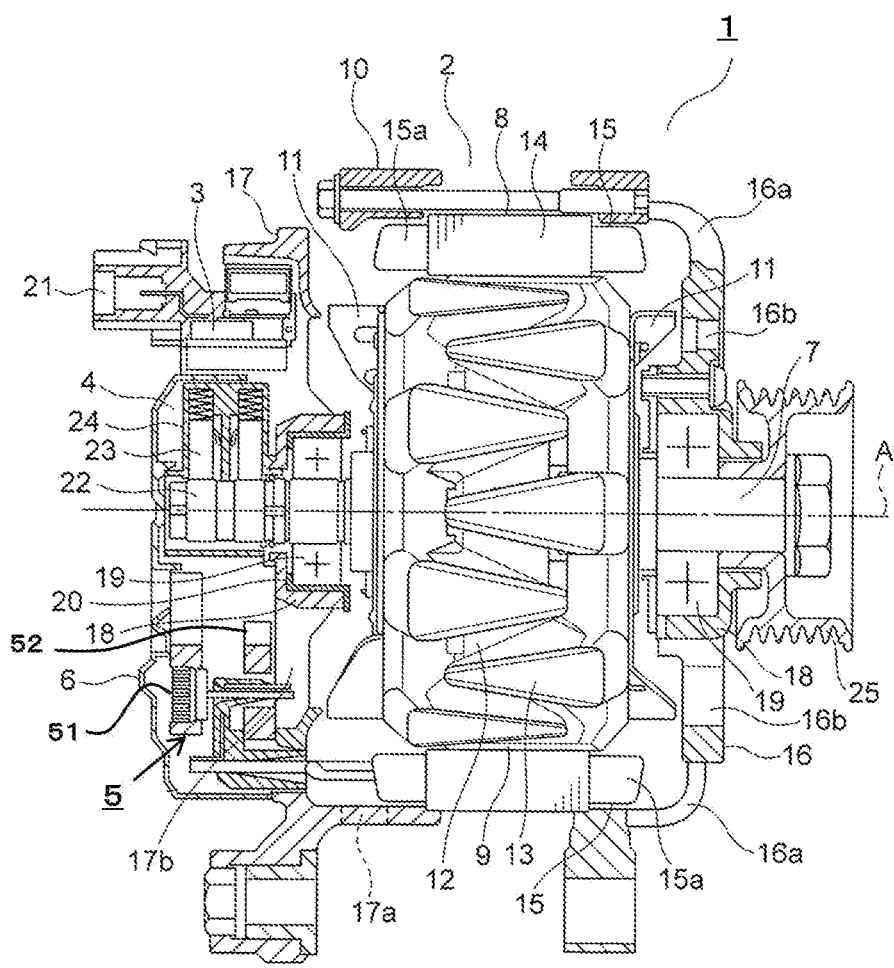
FIG. 1 is a longitudinal sectional view showing a schematic configuration of a vehicle-use alternating current generator according to a first embodiment of the invention.

FIG. 1 is a longitudinal sectional view showing a schematic configuration of a vehicle-use alternating current generator according to a first embodiment of the invention. In the drawing, a vehicle-use alternating current generator 1 has a generator main body 2, which is a rotating electrical machine main body, a voltage regulator 3, a brush device 4, and a rectifying device 5, each of which is attached to an outer periphery of the generator main body 2, and a cover 6 attached to the generator main body 2 and covering the voltage regulator 3, the brush device 4, and the rectifying device 5.

Also, the generator main body 2 has a rotating shaft 7 that rotates with an axial line A as a center, a tubular stator 8 disposed coaxially with the rotating shaft 7, a rotor 9 disposed opposing an inner side of the stator 8 and attached to the rotating shaft 7, a frame 10 that supports the rotating shaft 7, the stator 8, and the rotor 9, and a pair of fans 11 provided on either end portion of the rotor 9 in a direction along the axial line A.

Herein, the rotor 9 and the fans 11 rotate integrally with the rotating shaft 7 with the axial line A as a center, and a cooling air that cools an interior of the vehicle-use alternating current generator 1 is generated by the rotation of the fans 11. Also, the rotor 9 has a field coil 12 that generates a magnetic flux using a supply of an exciting current, and a pole core 13 on which the field coil 12 is provided, and in which a magnetic pole is formed by the magnetic flux of the field coil 12.

Also, the stator 8 has a cylindrical stator iron core 14 fixed to the frame 10 and enclosing an outer periphery of the rotor 9, and a multiple of stator coils 15 provided in the stator iron core 14. Alternating current electromotive force is generated in each stator coil 15 by the magnetic flux of the field coil 12 changing in accompaniment to the rotation of the rotor 9. Coil ends 15a at either end of each stator coil 15 are provided protruding in the axial direction from the stator iron core 14.

Furthermore, the frame 10 is configured of an aluminum front bracket 16 and a rear bracket 17, the front bracket 16 and the rear bracket 17 are each formed in an approximate bowl form of an end wall portion perpendicular to the axial line A and an outer peripheral face following the axial line A, and are fixed to each other with a multiple of bolts in a state sandwiching the stator iron core 14. Because of this, the fan 11 fixed to one axial direction end portion of the rotor 9 is covered by the front bracket 16, and the fan 11 fixed to the other axial direction end portion of the rotor 9 is covered by the rear bracket 17.

Furthermore, a shaft bearing attachment portion 18 and a shaft bearing 19 attached to the shaft bearing attachment portion 18 are provided in a center of each of the front bracket 16 and the rear bracket 17, and the rotating shaft 7 is supported so as to rotate freely across the shaft bearings 19.

Also, a multiple of front side exhaust holes 16a and a multiple of front side inlet holes 16b are provided in the front bracket 16. Each front side exhaust hole 16a is provided in an outer peripheral portion of the front bracket 16, and each front side inlet hole 16b is provided in the end wall portion of the front bracket 16 positioned in a periphery of the shaft bearing attachment portion 18 farther to an inner peripheral side than the front side exhaust holes 16a.

Furthermore, a multiple of rear side exhaust holes 17a and a multiple of rear side inlet holes 17b are provided in the rear bracket 17. Each rear side exhaust hole 17a is provided in an outer peripheral portion of the rear bracket 17, and each rear side inlet hole 17b is provided in the end wall portion of the rear bracket 17 positioned in the periphery of the shaft bearing attachment portion 18 farther to the inner peripheral side than the rear side exhaust holes 17a.

Also, the voltage regulator 3, the brush device 4, and the rectifying device 5 are attached to the outer peripheral face of the rear bracket 17, and the voltage regulator 3, the brush device 4, and the rectifying device 5 are disposed in a periphery of the rotating shaft 7 on an axial direction outer side of the generator main body 2.

Herein, the voltage regulator 3 regulates a magnitude of alternating current voltage generated in each stator coil 15, and is electrically connected to an unshown external device via a connector 21.

Also, the brush device 4 supplies a field current to the field coil 12 of the rotor 9 from an unshown battery, and has a pair of slip rings 22 fixed to a protruding portion of the rotating shaft 7, a pair of brushes 23 that come into contact one each with the pair of slip rings 22, and a brush holder 24 fixed to the rear bracket 17 and housing the brushes 23. The slip springs 22 slide against the brushes 23 owing to the rotation of the rotating shaft 7.

Furthermore, the rectifying device 5 rectifies the alternating current generated in each stator coil 15 into direct current, and is disposed so as to enclose the periphery of the rotating shaft 7 in a position avoiding the voltage regulator 3, the brush device 4, and the connector 21. Approximate positions of a positive side rectifying unit 51, which is a first rectifying unit configuring the rectifying device 5, and a negative side rectifying unit 52, which is a second rectifying unit, are shown in FIG. 1.

Meanwhile, a pulley 25 is fixed to a portion of the rotating shaft 7 protruding from the front bracket 16, and an unshown transmission belt coupled to an engine output shaft is wound around the pulley 25. Because of this, engine rotational torque is transmitted from the engine output shaft to the rotating shaft 7 via the transmission belt, whereby the rotating shaft 7, the rotor 9, and the fans 11 rotate with the axial line A as a center.

Next, a detailed configuration of each portion will be further described, based on FIG. 2 to FIG. 8.

Figure 2:
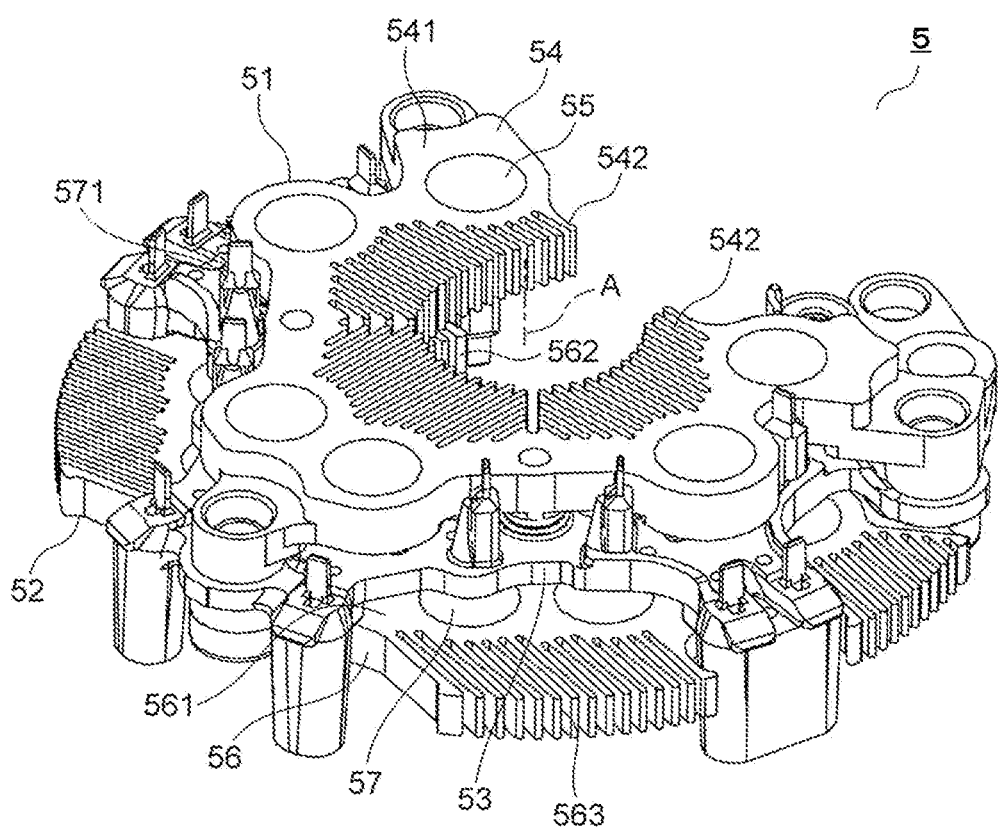
FIG. 2 is a perspective view showing a main configuration when a rectifying device of the vehicle-use alternating current generator in FIG. 1 is seen from a cover side.
Figure 3:
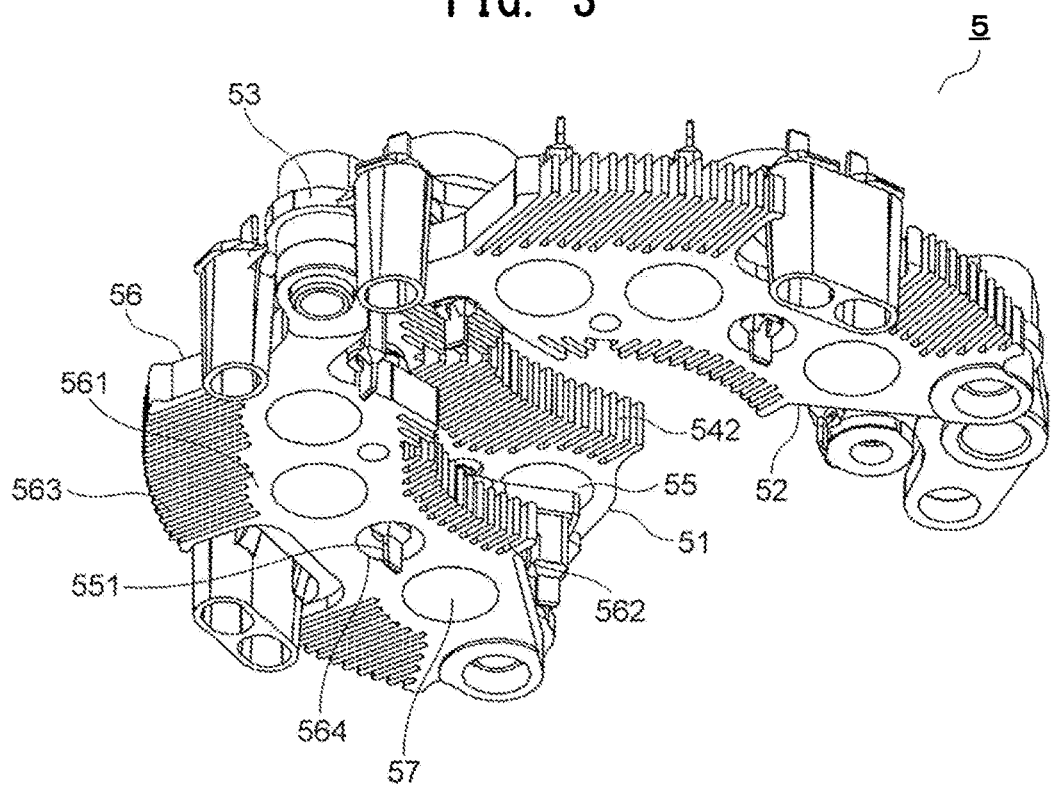
FIG. 3 is a perspective view showing a main configuration when the rectifying device in FIG. 1 is seen from a generator main body side.
Figure 4:
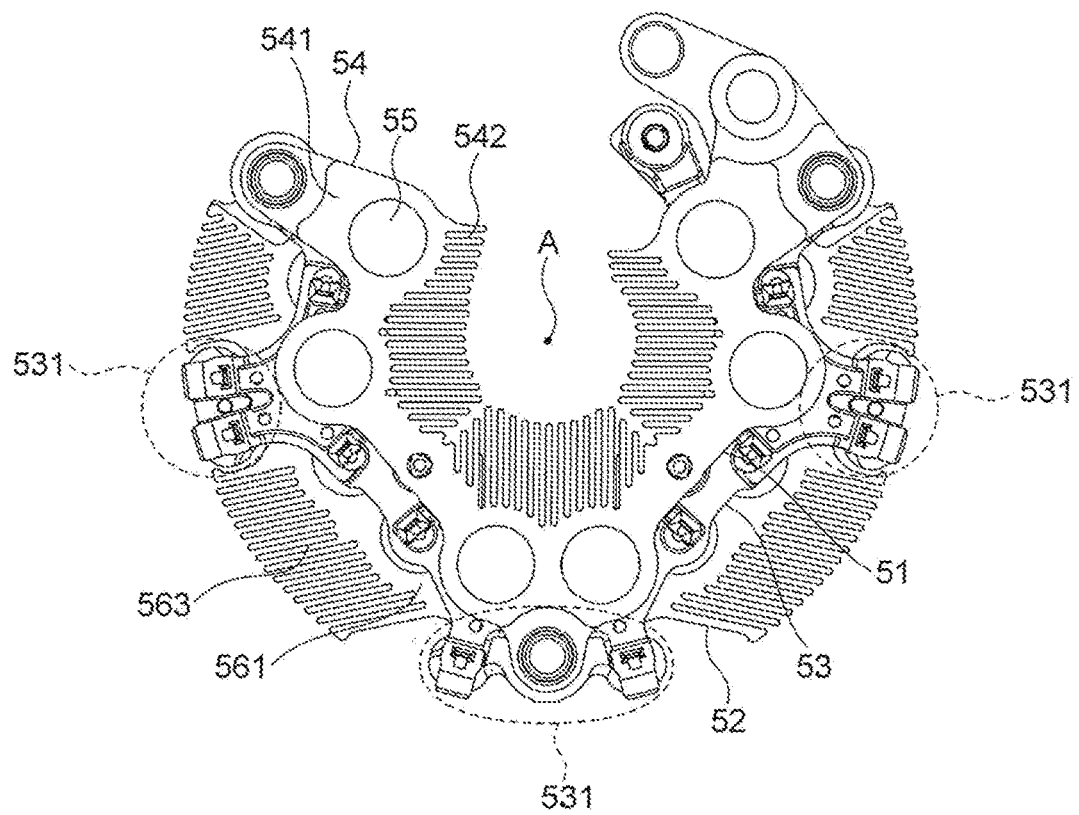
FIG. 4 is a front view showing a main configuration when the rectifying device in FIG. 1 is seen along an axial line from the cover side.
Figure 5:
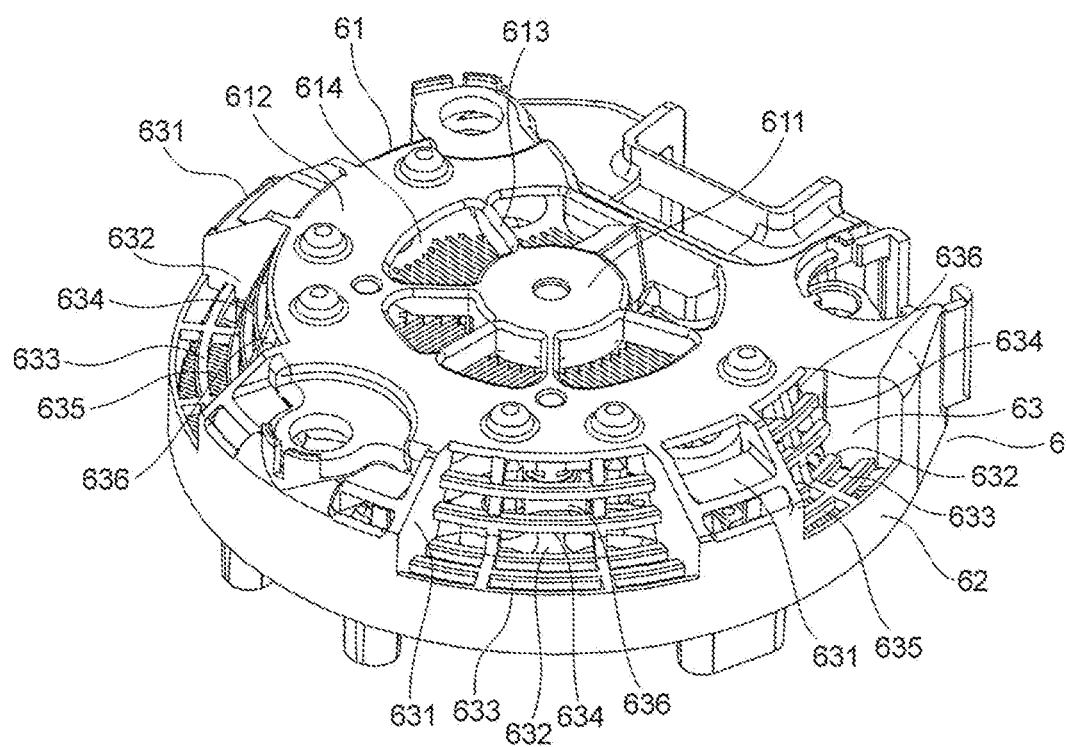
FIG. 5 is a perspective view showing the rectifying device in FIG. 2 in a state covered by the cover.
Figure 6:
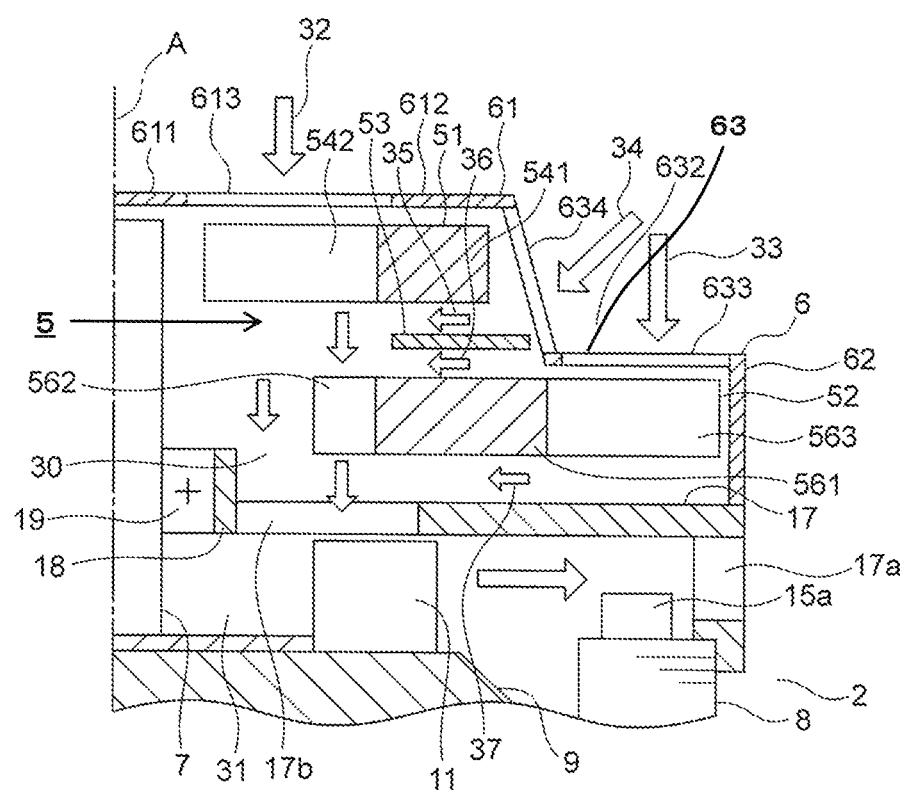
FIG. 6 is a schematic sectional view showing a positional relationship between the rectifying device and the cover in FIG. 1.
Figure 7:
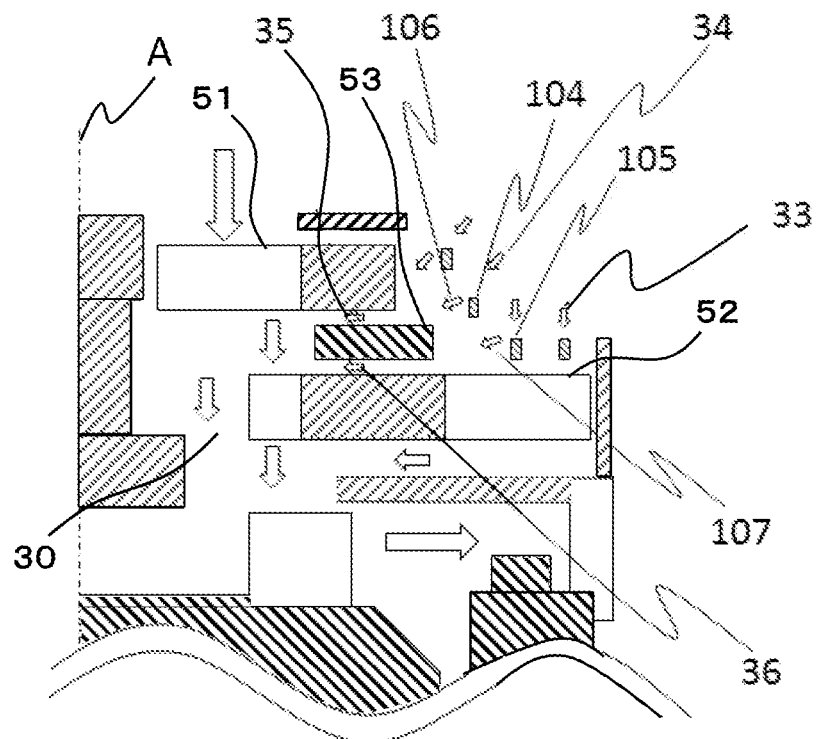
FIG. 7 is a sectional view for describing a flow of cooling air in FIG. 6.
Figure 8:
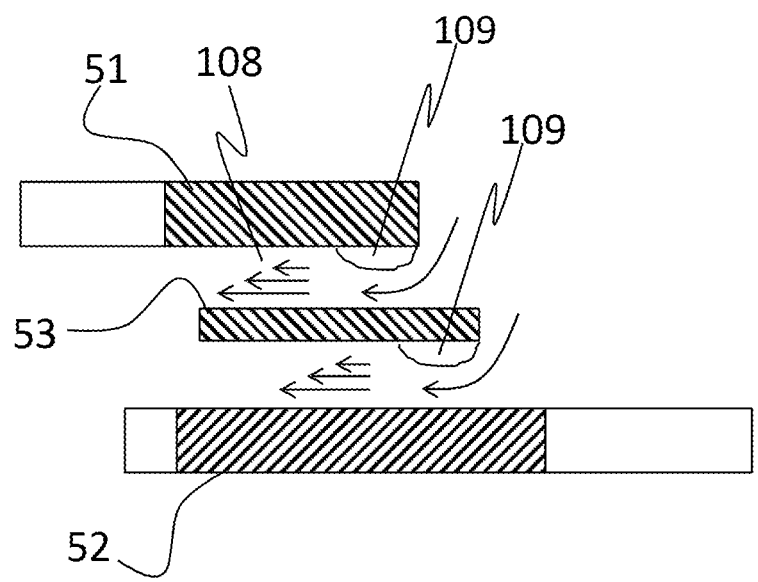
FIG. 8 is a sectional view for describing characteristics of the flow of cooling air in FIG. 7.

FIG. 2 is a perspective view showing a main configuration when the rectifying device of the vehicle-use alternating current generator in FIG. 1 is seen from the cover side, FIG. 3 is a perspective view showing a main configuration when the rectifying device in FIG. 1 is seen from the generator main body side, FIG. 4 is a front view showing a main configuration when the rectifying device in FIG. 1 is seen along the axial line from the cover side, FIG. 5 is a perspective view showing the rectifying device in FIG. 2 in a state covered by the cover, FIG. 6 is a schematic sectional view showing a positional relationship between the rectifying device and the cover in FIG. 1, FIG. 7 is a sectional view for describing a flow of cooling air in FIG. 6, and FIG. 8 is a sectional view for describing characteristics of the flow of cooling air in FIG. 7.

As shown in FIG. 2, the rectifying device 5 has the positive side rectifying unit 51, which is the first rectifying unit, disposed outward in the axial line A direction distanced from the generator main body 2, the negative side rectifying unit 52, which is the second rectifying unit, disposed between the positive side rectifying unit 51 and the rear bracket 17, and a circuit board 53 disposed between the positive side rectifying unit 51 and the negative side rectifying unit 52 and linking the positive side rectifying unit 51 and the negative side rectifying unit 52.

Herein, the positive side rectifying unit 51, the negative side rectifying unit 52, and the circuit board 53 are each of a plate form, are formed in a C-form enclosing the axial line A, and are disposed to have predetermined gaps in a direction perpendicular to the axial line A.

Also, the positive side rectifying unit 51 has a positive side heat sink 54, which is a first heat sink, and a multiple (six in this example) of positive side rectifying elements 55, which are first rectifying elements, attached to the positive side heat sink 54.

Herein, the positive side heat sink 54 has a C-form positive side heat sink main body 541, which is a first heat sink main body, to which each positive side rectifying element 55 is attached, and a multiple of positive side inner peripheral fins 542, which are first inner fins, protruding from an inner peripheral portion of the positive side heat sink main body 541. Also, each positive side inner peripheral fin 542 is disposed farther to a radial direction inner side than the positive side heat sink main body 541 along the axial line A.

Meanwhile, as shown in FIG. 3, the negative side rectifying unit 52 has a negative side heat sink 56, which is a second heat sink, and a multiple (six in this example) of negative side rectifying elements 57, which are second rectifying elements, attached to the negative side heat sink 56.

The negative side heat sink 56 has a C-form negative side heat sink main body 561, which is a second heat sink main body, to which each negative side rectifying element 57 is attached, a multiple of negative side inner peripheral fins 562, which are second inner fins, protruding from an inner peripheral portion of the negative side heat sink main body 561, and a multiple of negative side outer peripheral fins 563, which are second outer fins, protruding from an outer peripheral portion of the negative side heat sink main body 561. Each negative side inner peripheral fin 562 is disposed farther to the radial direction inner side than the negative side heat sink main body 561 along the axial line A, and each negative side outer peripheral fin 563 is disposed farther to a radial direction outer side than the negative side heat sink main body 561.

Each positive side inner peripheral fin 542, each negative side inner peripheral fin 562, and each negative side outer peripheral fin 563 are disposed in a position distanced from a region of the circuit board 53 when seen from the axial direction, as shown in FIG. 4. Also, a majority of the multiple of negative side inner peripheral fins 562 overlaps with the multiple of positive side inner peripheral fins 542 when seen from the axial direction. Because of this, at least one portion of gaps between the multiple of negative side inner peripheral fins 562 overlaps with gaps between the multiple of positive side inner peripheral fins 542 when seen from the axial direction. Furthermore, the multiple of negative side outer peripheral fins 563 are distanced farther to the radial direction outer side than regions of each of the positive side rectifying unit 51 and the circuit board 53 when seen from the axial direction. According to this kind of configuration, resistance applied by the negative side inner peripheral fins 562 to cooling air flowing on the radial direction inner side of the rectifying device 5 from the cover 6 side along the axial line A can be reduced, and resistance applied by the positive side rectifying unit 51 and the circuit board 53 to cooling air flowing on the radial direction outer side of the rectifying device 5 from the cover 6 side along the axial line A can be reduced.

Also, the circuit board 53 has a C-form insulating board configured of an electrically insulating material, and a conductor embedded in the insulating board. For example, a PPS (polyphenylene sulfide) resin or the like is used as the electrically insulating material configuring the insulating board. Because of this, an electrically insulated state is secured between the conductor of the circuit board 53 and a part in a periphery thereof.

As shown in FIG. 4, the positional relationships are such that a radial direction end portion of the circuit board 53 is larger in the radial direction than a radial direction end portion of the positive side heat sink 54, except for portions connecting with the stator coils 15 of the circuit board 53, a radial direction end portion of the negative side heat sink 56 is formed to be larger in the radial direction than the radial direction end portion of the circuit board 53, and the positive side heat sink 54, the circuit board 53, and the negative side heat sink 56 are formed so as to be practically of a stepped form.

Furthermore, a connection line protruding toward the negative side rectifying unit 52 from each positive side rectifying element 55 is connected to the conductor of the circuit board 53 by a positive side welded portion 551, as shown in FIG. 3, and a connection line protruding toward the positive side rectifying unit 51 from each negative side rectifying element 57 is connected to the conductor of the circuit board 53 by a negative side welded portion 571, as shown in FIG. 2. Because of this, the positive side rectifying elements 55 and the negative side rectifying elements 57 are electrically connected to each other in a one-to-one relationship via the conductor of the circuit board 53.

Also, as shown in FIG. 3, a through hole 564 through which the positive side welded portion 551 is passed is provided in the negative side heat sink main body 561 in order to prevent interference of the positive side welded portion 551 with respect to the negative side heat sink 56. Also, the negative side rectifying unit 52 is fixed directly to the rear bracket 17, whereby the negative side rectifying unit 52 and the rear bracket 17 are held at the same potential. Furthermore, the circuit board 53 and the positive side rectifying unit 51 are supported by the negative side rectifying unit 52.

Also, a multiple of lead-out wires (six in this case) from the stator coils 15 are individually connected to the conductor of the circuit board 53 by a multiple of connection portions positioned inside three regions 531 enclosed by broken lines in FIG. 4. The connection portion inside each of the ranges 531 is positioned farther to the radial direction outer side than the negative side heat sink main body 561. By the lead-out wire of each stator coil 15 being connected to the conductor of the circuit board 53, the lead-out wire is electrically connected to the rectifying device 5. Herein, a 6-phase alternating current generator wherein the rotor 9 has 12 poles and the stator iron core 14 has 72 slots is configured as the vehicle-use alternating current generator 1.

Furthermore, gaps, that is, spaces, exist between the positive side rectifying unit 51, the negative side rectifying unit 52, and the circuit board 53, as shown in FIG. 6. Because of this, a space on the radial direction outer side of the rectifying device 5 and a space on the radial direction inner side of the rectifying device 5 communicate with each other via a gap between the positive side rectifying unit 51 and the circuit board 53 and a gap between the negative side rectifying unit 52 and the circuit board 53. Also, a gap, that is, a space, also exists between the negative side rectifying unit 52 and the rear bracket 17.

That is, the radial direction outer side sizes of the negative side rectifying unit 52, the circuit board 53, and the positive side rectifying unit 51 configuring the rectifying device 5 are formed so as to decrease in the order of the negative side rectifying unit 52, the circuit board 53, and the positive side rectifying unit 51, and these are disposed sequentially at predetermined intervals in a direction away from the rear bracket 17.

Also, an amount by which each negative side inner peripheral fin 562 protrudes from the negative side heat sink main body 561 is less than an amount by which each positive side inner peripheral fin 542 protrudes from the positive side heat sink main body 541. Because of this, a distance between an inner peripheral end portion of each negative side inner peripheral fin 562 and the axial line A is greater than a distance between an inner peripheral end portion of each positive side inner peripheral fin 542 and the axial line A. Furthermore, a space 30 is formed as a cooling air flow path between an outer peripheral portion of the shaft bearing attachment unit 18 of the rear bracket 17 and each negative side inner peripheral fin 562, as shown in FIG. 6.

Next, the cover 6 has a plate-form cover end wall portion 61 positioned farther to the axial direction outer side than the rectifying device 5 when seen from the generator main body 2, a tubular cover outer wall portion 62 positioned farther to the radial direction outer side than the rectifying device 5, and a cover intermediate portion 63 interposed between the cover end wall portion 61 and the cover outer wall portion 62.

Herein, the cover end wall portion 61 has a disk-form central plate portion 611, a circumferential plate portion 612 that encloses a periphery of the central plate portion 611, and an inner peripheral side inlet portion 613 formed of an aperture provided between the central plate portion 611 and the circumferential plate portion 612.

As shown in FIG. 5, the central plate portion 611 and the circumferential plate portion 612 of the cover end wall portion 61 are each portions that prevent external air from passing. Also, the inner peripheral side inlet portion 613 is partitioned by ribs reaching the circumferential plate portion 612 from the central plate portion 611, whereby a multiple of inlet holes 614 are formed arrayed in a circumferential direction, and takes in external air through the inlet holes 614.

Herein, as shown in FIG. 6, the central plate portion 611 opposes an end portion of the rotating shaft 7, and the inner peripheral side inlet portion 613 opposes the positive side inner peripheral fins 542. Also, the circumferential plate portion 612 is formed in a position opposing the positive side heat sink main body 541 when seen in the axial direction. Because of this, the circumferential plate portion 612 is disposed avoiding the positive side inner peripheral fins 542, the negative side inner peripheral fins 562, and the negative side outer peripheral fins 563.

Also, as shown in FIG. 5, the cover intermediate portion has a multiple of linking portions 631 disposed with intervals there between in the circumferential direction of the cover 6, and a multiple of outer peripheral side inlet portions 632 existing one in each interval between the linking portions 631.

The linking portions 631 link an outer peripheral portion of the circumferential plate portion 612 and the cover outer wall portion 62. Also, the linking portions 631, as shown in FIG. 4, are disposed overlapping with the regions 531 enclosing portions of the circuit board 53 connecting with the lead-out wires of the stator coils 15, and avoiding the negative side outer peripheral fins 563, when seen in the axial direction. In this example, the three linking portions 631 are connected to the cover end wall portion 61 and the cover outer wall portion 62, and four outer peripheral side inlet portions 632 partitioned by the three linking portions 631 are formed in the cover intermediate portion 63.

Furthermore, as shown in FIG. 6, each outer peripheral side inlet portion 632 has a radial direction covering portion 633 that exists in a position nearer in the axial direction than the cover end wall portion 61 to the generator main body 2, and an axial direction covering portion 634 that connects the outer peripheral portion of the circumferential plate portion 612 and the radial direction covering portion 633.

Herein, the radial direction covering portion 633 opposes the negative side outer peripheral fins 563, and is disposed in a position nearer in the axial direction than an upper face of the circuit board 53 to the negative side heat sink 56.

Also, a multiple of inlet holes 635 are provided in the radial direction covering portion 633. Because of this, the radial direction covering portion 633 allows a passing of external air through the inlet holes 635.

The inlet holes 635 are formed in a lattice form. Also, as shown in FIG. 7, a circular lattice 105 configuring the radial direction covering portion 633 is disposed farther to the outer side in the axial line A direction (an upper side in FIG. 7) than a gap formed between the negative side heat sink 56 and the circuit board 53.

Also, the axial direction covering portion 634 exists farther to the radial direction inner side than the radial direction covering portion 633, and opposes the positive side rectifying unit 51 and a radial direction end face of the circuit board 53. Also, the axial direction covering portion 634 inclines from the radial direction covering portion 633 toward the circumferential plate portion 612 in a direction nearing the axial line A, and a multiple of inlet holes 636 are provided in the axial direction covering portion 634. Because of this, the axial direction covering portion 634 allows a passing of external air through the inlet holes 636. The inlet holes 636 are formed in a lattice form, and a total area of the inlet holes 635 and 636 provided in the outer peripheral side inlet portion 632 is formed so as to be greater than a total area of the inlet holes 614 provided in the inner peripheral side inlet portion 613. Also, as shown in FIG. 7, one portion 104 of circumferential ribs configuring the axial direction covering portion 634 is disposed farther to the outer side in the axial line A direction (the upper side in FIG. 7) than a gap formed between the positive side heat sink 54 and the circuit board 53.

Furthermore, the cover outer wall portion 62 opposes an outer end face of the negative side rectifying unit 52, and prevents a passing of external air. Herein, the cover outer wall portion 62 is disposed only in a region between the radial direction covering portion 633 and the rear bracket 17 in the axial direction.

Next, an action of the vehicle-use alternating current generator 1 configured in this way will be described.

Firstly, when a field current is supplied from the unshown battery to the field coil 12 via the brush device 4, a magnetic flux is generated from the field coil 12, and N-poles and S-poles are alternately formed in a circumferential direction in an outer peripheral portion of the pole core 13 of the rotor 9. Also, when engine rotational torque is transmitted to the rotating shaft 7 via the transmission belt and the pulley 25, the rotor 9 and the fans 11 rotate integrally with the rotating shaft 7 with the axial line A as a center.

When the rotor 9 rotates in a state in which N-poles and S-poles are formed in the pole core 13 in this way, a rotating magnetic field of the rotor 9 acts on each stator coil 15, causing an alternating current electromotive force to be generated in each stator coil 15. Because of this, alternating current is supplied to the rectifying device 5 from each stator coil 15, and rectified to direct current in the rectifying device 5. The current rectified in the rectifying device 5 is supplied to the battery, charged, and supplied to an electrical load, causing the electrical load to operate.

Also, by the fans 11 rotating integrally with the rotor 9, external air is taken as cooling air into the frame 10 from the front side inlet holes 16b on the front side, and external air is taken as cooling air into the cover 6 from the inner peripheral side inlet portion 613 and the outer peripheral side inlet portion 632 of the cover 6 on the rear side.

The cooling air taken into the frame 10 from the front side inlet holes 16b is fed by the rotation of the front side fan 11 in an outer peripheral direction of the fan 11, and expelled to the exterior via the front side exhaust holes 16a.

Meanwhile, the cooling air taken into the cover 6 from the inner peripheral side inlet portion 613 and the outer peripheral side inlet portion 632 of the cover 6 is taken into the frame 10 from the rear side inlet holes 17b, fed in a centrifugal direction by the rotation of the rear side fan 11, and subsequently expelled to the exterior via the rear side exhaust holes 17a.

Also, the cooling air fed by the rotation of the front side and rear side fans 11 in the outer peripheral direction of the fans 11 is expelled to the exterior via the coil ends 15a, whereby one portion of heat generated in the stator 8 is dissipated. Furthermore, one portion of the heat generated in the stator 8 is transmitted to the front bracket 16 and the rear bracket 17, and exposed to the cooling air via ribs partitioning the front side exhaust holes 16a and the rear side exhaust holes 17a, whereby the stator 8 is cooled.

Also, the rectifying device 5 is cooled by the cooling air taken into the cover 6 from the inner peripheral side inlet portion 613 and the outer peripheral side inlet portion 632 of the cover 6.

Next, a flow of the cooling air taken into the cover 6 will be described, using FIG. 6 to FIG. 8.

As shown in FIG. 6, when the rear side fan 11 rotates, a negative pressure region 31 appears on the radial direction inner side of the rear side fan 11, and a flow of the cooling air toward the negative pressure region 31 occurs. The cooling air flowing from the inner peripheral side inlet portion 613 in a direction indicated by an arrow 32, that is, in a direction along the axial line A, is taken into the cover 6, and the cooling air flows through the gaps between the positive side inner peripheral fins 542 toward the rear side fan 11, and absorbs heat generated in the positive side rectifying unit 51. Because of this, the positive side rectifying elements 55 are cooled.

Subsequently, of the cooling air exiting from the gaps between the positive side inner peripheral fins 542, one portion flows through the gaps between the negative side inner peripheral fins 562 toward the rear side fan 11, and absorbs heat generated in the negative side rectifying unit 52, and the remainder flows along the space 30 between the negative side inner peripheral fins 562 and the shaft bearing attachment portion 18 of the rear bracket 17, and absorbs heat from the shaft bearing attachment portion 18 of the rear bracket 17. Because of this, the negative side rectifying unit 52 is cooled, and the shaft bearing attachment portion 18 and the shaft bearing 19 of the rear bracket 17 are cooled. Subsequently, the cooling air is taken into the frame 10 from the rear side inlet holes 17b. In this way, the cooling air taken into the cover 6 from the inner peripheral side inlet portion 613 flows practically without changing the flow orientation until reaching the rear side inlet holes 17b.

Meanwhile, the cooling air taken into the cover 6 from the outer peripheral side inlet portion 632 is taken into the cover 6 divided into cooling air flowing toward the radial direction covering portion 633 in a direction indicated by an arrow 33 and cooling air flowing toward the axial direction covering portion 634 in a direction indicated by an arrow 34. As the total area of the inlet holes 635 and 636 of the outer peripheral side inlet portion 632 is formed to be greater than the total area of the inlet holes 614 of the inner peripheral side inlet portion 613, speed of the cooling air taken into the cover 6 from the outer peripheral side inlet portion 632 is less than speed of the cooling air taken into the cover 6 from the inner peripheral side inlet portion 613.

The cooling air taken into the cover 6 from the radial direction covering portion 633 flows through gaps between the negative side outer peripheral fins 563 toward the rear bracket 17, and absorbs heat generated in the negative side rectifying unit 52, but because speed of the cooling air is low at this time, cooling air pressure loss due to the negative side outer peripheral fins 563 is restricted. Because of this, the negative side rectifying elements 57 are cooled.

Subsequently, cooling air exiting from the gaps between the negative side outer peripheral fins 563 flows through the gap between the rear bracket 17 and the negative side rectifying unit 52 in a radial direction indicated by an arrow 37, and is subsequently taken into the frame 10 from the rear side inlet holes 17b.

Also, the cooling air taken into the cover 6 from the radial direction covering unit 633 is divided into cooling air flowing through the gap between the positive side rectifying unit 51 and the circuit board 53 toward the radial direction inner side of the rectifying device 5 in a direction indicated by an arrow 35 and cooling air flowing through the gap between the circuit board 53 and the negative side rectifying unit 52 toward the radial direction inner side of the rectifying device 5 in a direction indicated by an arrow 36.

The cooling air flowing in the direction indicated by the arrow 35 cools the positive side rectifying unit 51 and the circuit board 53, but in order to obtain a higher cooling performance, the amount of air needs to be increased. By the circuit board 53 being larger in the radial direction than the positive side heat sink main body 541, the flow of cooling air can be led into the gap between the positive side rectifying unit 51 and the circuit board 53, and the amount of cooling air flowing through the gap can be increased. Consequently, coolability of a diode attached to the positive side rectifying unit 51 and a heat generating part such as a terminal of a current path in the circuit board 53 can be increased.

Herein, when cooling air enters the gap between the positive side rectifying unit 51 and the circuit board 53, the orientation thereof changes by 90 degrees, because of which a separation region 109 is formed due to an effect of centrifugal force in a vicinity of an entrance of the positive side rectifying unit 51, as shown in FIG. 8. A temperature of cooling air in the separation region 109 is high, and a difference with a temperature of the positive side heat sink 54 is small, because of which coolability decreases. Also, because of the separation region 109, there is a speed distribution 108 such that a flow speed on the circuit board side is high while a flow speed on the positive side rectifying unit 51 side is low downstream in the flow of the arrow 35, and coolability in the periphery of the positive side rectifying unit 51 decreases. Furthermore, after cooling air passes through the gap between the positive side rectifying unit 51 and the circuit board 53, the flow changes by 90 degrees in the axial line A direction, but the high flow speed on the circuit board 53 side forms a considerable resistance when the angle is changed, and an increase in the amount of cooling air flowing through the gap is restricted.

In the first embodiment, in order to resolve this kind of problem, the circuit board 53 is formed larger in the radial direction than the positive side rectifying unit 51, an upper face of the one portion 104 of the circumferential ribs configuring the radial direction covering portion 633 is disposed farther to the outer side in the axial line A direction (an upper side in the drawing) than the gap between the circuit board 53 and the positive side rectifying unit 51, and the upper face of the rib 104 is formed in a rectangular form having a plane parallel to the radial direction, as shown in FIG. 7. Owing to the rib 104, a flow 106 of cooling air on an upstream side entering the gap between the positive side rectifying unit 51 and the circuit board 53 can be brought nearer the radial direction, the speed of cooling air in a vicinity of a lower face of the positive side heat sink 54 is increased by restricting the generation of the separation region 109, and the cooling performance of the positive side heat sink 54 can be improved. Also, by restricting the generation of the separation region 109, the speed distribution of the cooling air in the gap can be brought nearer to uniformity, the resistance when the direction of the cooling air is changed by 90 degrees on the downstream side is reduced, and the amount of air flowing through the gap can be increased.

Also, the cooling air flowing in the direction indicated by the arrow 36 cools the negative side rectifying unit 52 and the circuit board 53, but in order to obtain a higher cooling performance, the amount of air needs to be increased. Because of this, by the negative side rectifying unit 52 being larger in the radial direction than the circuit board 53, the flow of cooling air can be led into the gap between the negative side rectifying unit 52 and the circuit board 53, the amount of cooling air flowing through the gap can be increased, and coolability of a diode attached to the negative side rectifying unit 52 and a heat generating part such as a terminal of a current path in the circuit board 53 can be increased.

Simply by the negative side rectifying unit 52 being larger in the radial direction than the circuit board 53, the orientation of cooling air changes by 90 degrees when the cooling air enters the gap between the negative side rectifying unit 52 and the circuit board 53, because of which, as heretofore described, the separation region 109 is formed due to an effect of centrifugal force in a vicinity of an entrance of the circuit board 53. The temperature of cooling air in the separation region 109 is high, and a difference with a temperature of the circuit board 53 is small, because of which coolability decreases. Also, because of the separation region 109, there is a speed distribution such that a flow speed on the negative side rectifying unit 52 side is high while the flow speed on the circuit board 53 side is low downstream in the flow of the arrow 36, speed in the periphery of the circuit board 53 is low, and coolability decreases. Furthermore, after cooling air passes through the gap between the negative side rectifying unit 52 and the circuit board 53, the flow changes by 90 degrees in the axial line A direction, but the high flow speed on the negative side rectifying unit 52 side forms a considerable resistance when the angle is changed, and an increase in the amount of cooling air flowing through the gap is restricted.

In the first embodiment, in order to resolve this kind of problem, an outer diameter of the circuit board 53 is formed smaller in the radial direction than the negative side rectifying unit 52, an upper face of a circumferential rib 105 configuring the radial direction covering portion 633 is disposed farther to the outer side in the axial line A direction (the upper side in the drawing) than the gap between the circuit board 53 and the negative side rectifying unit 52, and the upper face of the rib 105 is formed in a rectangular form having a plane parallel to the radial direction, as shown in FIG. 7. Owing to the rib 105, a flow 107 on an upstream side entering the gap between the negative side rectifying unit 52 and the circuit board 53 can be brought nearer the radial direction, the generation of the separation region is restricted, the speed of cooling air in a vicinity of a lower face of the circuit board 53 is increased, and the cooling performance of the circuit board 53 can be improved. Also, by restricting the generation of the separation region 109, the speed distribution of the cooling air in the gap can be brought nearer to uniformity, the resistance when the direction of the cooling air is changed by 90 degrees on the downstream side is reduced, and the amount of air flowing through the gap can be increased.

Furthermore, this kind of vehicle-use alternating current generator 1 is such that the inner peripheral side inlet portion 613 and the outer peripheral side inlet portion 632 are provided in the cover 6, and the outer peripheral side inlet portion 632 has the radial direction covering portion 633 that exists in a position nearer in the axial direction than the cover end wall portion 61 to the generator main body 2, and the axial direction covering portion 634 that connects the radial direction covering portion 633 and an outer peripheral portion of the cover end wall portion 61, because of which an area of the outer peripheral side inlet portion 632 can be increased while restricting an increase in size of the cover 6. Because of this, the speed of cooling air taken into the cover 6 from the outer peripheral side inlet portion 632 can be reduced, and pressure loss of cooling air flowing inside the cover 6 and the frame 10 can be reduced. Also, as cooling air can be supplied into the cover 6 and the frame 10 from the inner peripheral side inlet portion 613, the amount of cooling air taken into the cover 6 and the frame 10 can be increased, and cooling performance with respect to parts in the cover 6 and the frame 10, for example, the rectifying device 5, the rear bracket 17, the shaft bearing attachment portion 18, the shaft bearing 19, and the stator 8, can be improved, while restricting an increase in size of the vehicle-use alternating current generator 1.

Also, the negative side outer peripheral fins 563 of the negative side rectifying unit 52 are disposed farther to the radial direction outer side than the regions of each of the positive side rectifying unit 51 and the circuit board 53, and the radial direction covering portion 633 opposes the negative side outer peripheral fins 563, because of which low-speed cooling air taken into the cover 6 from the radial direction covering portion 633 can easily be supplied to the gaps between the negative side outer peripheral fins 563. Also, even though the cooling air flows between all of the negative side outer peripheral fins 563, the cooling air speed is low, because of which cooling air pressure loss can be reduced. Because of this, the gaps between the negative side outer peripheral fins 563 can be reduced in size, and the number of negative side outer peripheral fins 563 can be increased. Consequently, cooling performance with respect to the negative side rectifying elements 57 can be further improved.

Furthermore, the inner peripheral side inlet portion 613 opposes the positive side inner peripheral fins 542 of the positive side rectifying unit 51, because of which cooling air taken into the cover 6 from the inner peripheral side inlet portion 613 can easily flow through the gaps of the positive side inner peripheral fins 542, and cooling performance with respect to the positive side rectifying elements 55 can be further improved.

Also, the negative side rectifying unit 52 has the multiple of negative side inner peripheral fins 562 in which gaps are provided in the axial direction farther to the radial direction inner side than the negative side heat sink main body 561, because of which cooling air that passes through the gaps between the multiple of positive side inner peripheral fins 542 of the positive side rectifying unit 51 can be caused to flow into the gaps of the negative side inner peripheral fins 562, and cooling performance with respect to the negative side rectifying elements 57 can be further improved.

Second Embodiment

In the first embodiment, a description has been given of a case in which the upper faces of ribs in the radial direction covering portion 633 and the inclined axial direction covering portion 634 are formed in a rectangular sectional form parallel to the radial direction, but the upper faces of the ribs may also be of an inclined trapezoidal form, and this kind of second embodiment will be described using FIG. 9 and FIG. 10.

Figure 9:
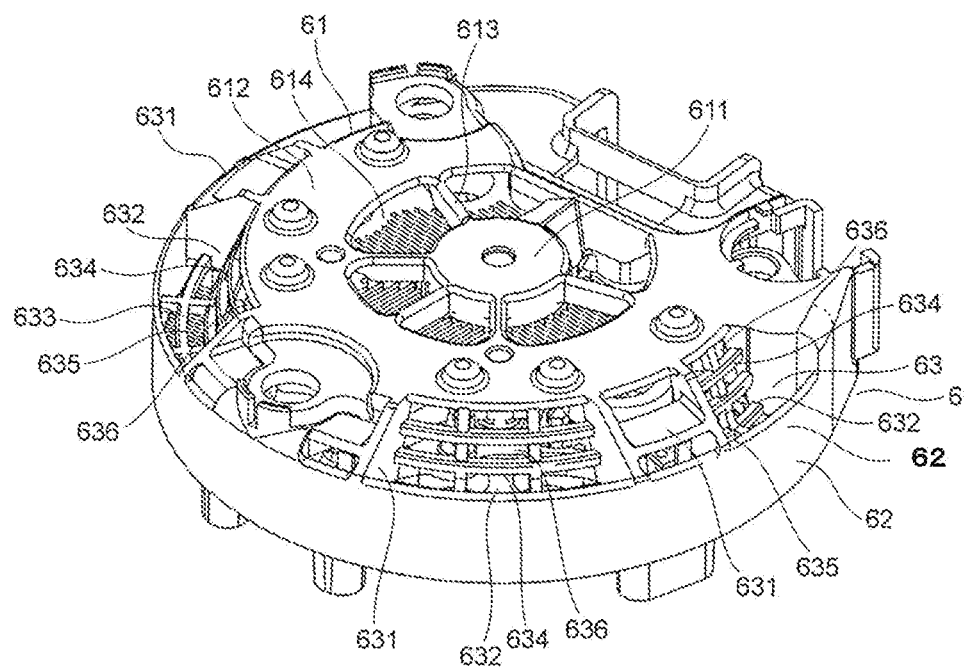
FIG. 9 is a perspective view showing a schematic configuration of a vehicle-use alternating current generator according to a second embodiment of the invention.
Figure 10:
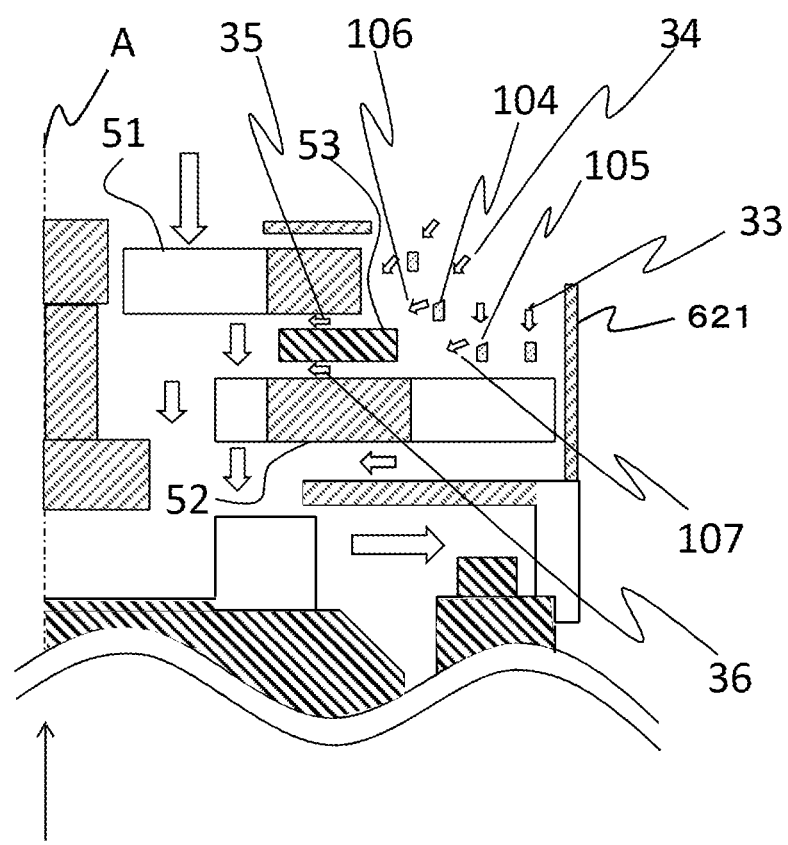
FIG. 10 is a sectional view for describing a flow of cooling air in FIG. 9.

FIG. 9 is a perspective view showing a state wherein the rectifying device 5 of the vehicle-use alternating current generator 1 according to the second embodiment is covered by the cover 6, and FIG. 10 is a sectional view for describing a flow of cooling air in FIG. 9.

In the drawings, the second embodiment is such that an outer wall extension portion 621 wherein one portion of the cover outer wall portion 62 is extended in the axial line A direction is provided, the outer diameter of the circuit board 53 is formed larger in the radial direction than the positive side rectifying unit 51, and the upper face of the one portion 104 of circumferential ribs configuring the axial direction covering portion 634 is disposed farther to the outer side in the axial line A direction (an upper side in the drawings) than the gap between the circuit board 53 and the positive side rectifying unit 51. Also, the rib 104 is formed in a trapezoidal form having a plane such that the upper face is inclined to the circuit board 53 side.

Furthermore, the outer diameter of the circuit board 53 is formed smaller in the radial direction than the negative side rectifying unit 52, the upper face of the circumferential rib 105 configuring the radial direction covering portion 633 is disposed farther to the outer side in the axial line A direction (the upper side in the drawings) than the gap between the circuit board 53 and the negative side rectifying unit 52, and the upper face of the rib 105 is formed in a trapezoidal form inclined to the negative side rectifying unit 52 side.

By the upper face of the rib 104 being caused to incline in this way, the flow 106 of cooling air on the upstream side entering the gap between the positive side rectifying unit 51 and the circuit board 53 can be brought nearer the radial direction, and loss occurring when changing the angle can be reduced as far as possible. As a result of this, the generation of the separation region 109 is restricted, the speed of cooling air in a vicinity of the lower face of the positive side heat sink 54 is increased, and the cooling performance of the positive side heat sink 54 can be improved. Also, by restricting the generation of the separation region 109, the speed distribution of the cooling air in the gap can be brought nearer to uniformity, the resistance when the direction of the cooling air is changed by 90 degrees on the downstream side is reduced, and the amount of air flowing through the gap can be increased.

Also, owing to the rib 105, the flow 107 of cooling air on the upstream side entering the gap between the negative side rectifying unit 52 and the circuit board 53 can be brought nearer the radial direction, the generation of the separation region 109 is restricted, the speed of cooling air in a vicinity of the lower face of the circuit board 53 is increased, and the cooling performance of the circuit board 53 can be improved. Also, by restricting the generation of the separation region 109, the speed distribution of the cooling air in the gap can be brought nearer to uniformity, the resistance when the direction of the cooling air is changed by 90 degrees on the downstream side is reduced, and the amount of air flowing through the gap can be increased.

In the heretofore described embodiments, a description has been given of a rotating electrical machine applied to a vehicle-use alternating current generator, but the invention is also applicable to a rotating electrical machine such as a normal alternating current generator not mounted in a vehicle or a generator motor. Also, each embodiment can be modified or abbreviated as appropriate, without departing from the scope of the invention.

REFERENCE SIGNS LIST

1: Vehicle-use alternating current generator (rotating electrical machine), 2: Generator main body (rotating electrical machine main body), 5: Rectifying device, 6: Cover, 8: Stator, 9: Rotor, 10: Frame, 11: Fan, 51: Positive side rectifying unit (first rectifying unit), 52: Negative side rectifying unit (second rectifying unit), 53: Circuit board, 61: Cover end wall portion, 62: Cover outer wall portion, 63: Cover intermediate portion, 54: Positive side heat sink (first heat sink), 55: Positive side rectifying element (first rectifying element), 56: Negative side heat sink (second heat sink), 57: Negative side rectifying element (second rectifying element), 541: Positive side heat sink main body (first heat sink main body), 542: Positive side inner peripheral fin (first inner fin), 561: Negative side heat sink main body (second heat sink main body), 562: Negative side inner peripheral fin (second inner fin), 563: Negative side outer peripheral fin (second outer fin), 613: Inner peripheral side inlet portion, 614, 635, 636: Inlet hole, 621: Outer wall extension portion, 632: Outer peripheral side inlet portion, 633: Radial direction covering portion, 634: Axial direction covering portion.

The invention claimed is:

1. A rotating electrical machine, comprising:
a rotating electrical machine main body having a stator, a rotor disposed opposing the stator and rotating with an axial line of a rotating shaft as a center, a fan provided on an axial line direction end portion of the rotor, and a frame that supports the stator and the rotor;
a rectifying device attached to the rotating electrical machine main body on an outer side in the axial line direction of the rotating electrical machine main body; and
a cover attached to the rotating electrical machine main body and covering the rectifying device, wherein
the rectifying device has a plate-form first rectifying unit provided on the cover side, a plate-form second rectifying unit provided on the frame side, and a plate-form circuit board provided between the first rectifying unit and the second rectifying unit, and radial direction outer side sizes of the second rectifying unit, the circuit board, and the first rectifying unit are formed so as to be sequentially smaller in a direction away from the frame, and are disposed at predetermined intervals,
the cover is formed of a cover end wall portion positioned farther to the outer side in the axial line direction than the rectifying device, a cover outer wall portion positioned farther to the outer side in the radial direction than the rectifying device, and a cover intermediate portion interposed between the cover end wall portion and the cover outer wall portion, an inner peripheral side inlet portion having an inlet hole is formed in the cover end wall portion, an outer peripheral side inlet portion having an inlet hole is formed in the cover intermediate portion, and the outer peripheral side inlet portion has a radial direction covering portion existing in a position nearer the frame in the axial line direction than the cover end wall portion, and an axial direction covering portion that connects the radial direction covering portion and an outer peripheral portion of the cover end wall portion,
an upper face of one portion of circumferential ribs configuring an inlet port of the axial direction covering portion is positioned farther to the outer side in the axial line direction than a gap between the circuit board and the first rectifying unit, and
an upper face of one portion of circumferential ribs configuring an inlet port of the radial direction covering portion is positioned farther to the outer side in the axial line direction than a gap between the circuit board and the second rectifying unit.

2. The rotating electrical machine according to claim 1, wherein the upper face of the one portion of circumferential ribs configuring the inlet port of the radial direction covering portion and the upper face of the one portion of circumferential ribs configuring the inlet port of the axial direction covering portion are of a rectangular form having a plane parallel to the radial direction of the rotating shaft.

3. The rotating electrical machine according to claim 1, wherein an upper face of a circumferential rib configuring the inlet port of the radial direction covering portion and an upper face of a circumferential rib configuring the inlet port of the axial direction covering portion are of a trapezoidal form caused to incline to the second rectifying unit side.

* * * * *